United States Patent [19]
Leblanc et al.

[11] Patent Number: 5,977,274
[45] Date of Patent: Nov. 2, 1999

[54] METHOD FOR MAKING POLYMERS FROM N-VINYL FORMAMIDE MONOMER

[75] Inventors: Jean-Pierre Leblanc, Somerville; Rama S. Chandran, Bridgewater, both of N.J.

[73] Assignee: National Starch and Chemical Investment Holding Corporation, Wilmington, Del.

[21] Appl. No.: 09/036,801

[22] Filed: Mar. 9, 1998

[51] Int. Cl.⁶ ........................................................ C08F 2/14
[52] U.S. Cl. ............................ 526/212; 526/77; 526/210; 526/303.1; 526/307.1; 526/307.3
[58] Field of Search .............................. 526/307.3, 307.1, 526/303.1, 210, 212

[56] References Cited

U.S. PATENT DOCUMENTS

| | | | |
|---|---|---|---|
| Re. 34,713 | 8/1994 | Itagaki et al. | 525/328.4 |
| 3,679,645 | 7/1972 | Hort . | |
| 4,421,602 | 12/1983 | Brunnmueller et al. | 162/168.2 |
| 4,578,515 | 3/1986 | Dawson et al. | 564/215 |
| 4,623,699 | 11/1986 | Brunnmueller et al. | 525/355 |
| 4,814,505 | 3/1989 | Kroener et al. | 564/216 |
| 4,906,777 | 3/1990 | Pinschmidt et al. | 564/215 |
| 4,942,259 | 7/1990 | Parris et al. | 564/187 |
| 4,943,676 | 7/1990 | Pinschmidt et al. | 525/383 |
| 4,943,679 | 7/1990 | Pinschmidt et al. | 525/383 |
| 5,037,927 | 8/1991 | Itagaki et al. | 526/307.7 |
| 5,064,909 | 11/1991 | Itagaki et al. | 525/340 |
| 5,130,388 | 7/1992 | Shih | 526/228 |
| 5,280,095 | 1/1994 | Aizawa et al. | 526/307.6 |
| 5,373,076 | 12/1994 | Pinschmidt et al. | 526/303.1 |
| 5,478,553 | 12/1995 | Chandran et al. | 424/70.17 |

FOREIGN PATENT DOCUMENTS

| | | |
|---|---|---|
| 1194648 | 10/1985 | Canada . |
| 5-97931 | 4/1993 | Japan . |
| 6-122725 | 5/1994 | Japan . |
| 6-179644 | 6/1994 | Japan . |

OTHER PUBLICATIONS

R.J. Badesso et al., "Synthesis of Amine Functional Homopolymers with N–Ethenylformamide" in Advanced Chemical Series, 1996, (Hydrophilic Polymers) pp. 489–504.

*Primary Examiner*—Fred Zitomer
*Attorney, Agent, or Firm*—Eugene Zagarella, Jr.

[57] ABSTRACT

The present invention is directed to precipitation polymerization processes for the manufacture of polymers prepared from N-vinyl formamide monomer, the processes including the steps of contacting the N-vinyl formamide monomer with a polymerization medium containing t-butanol as diluent and a free-radical initiator, under conditions effective to polymerize the N-vinyl formamide monomer, thereby forming a precipitate of the polymer in the polymerization medium, substantially isolating the precipitated polymer from the polymerization medium, contacting the substantially isolated polymer with a wash containing a different diluent than the t-butanol used in the polymerization and isolating the washed polymer from the wash.

8 Claims, No Drawings

5,977,274

METHOD FOR MAKING POLYMERS FROM N-VINYL FORMAMIDE MONOMER

FIELD OF THE INVENTION

The present invention relates to a precipitation polymerization process for making polymers which are prepared from N-vinyl formamide monomer and which have significantly reduced levels of non-polymerizable contaminants.

BACKGROUND OF THE INVENTION

In the preparation of polymers, processes have been utilized to substantially reduce residual monomer levels. For instance, it is known to purify a polymer solution/emulsion on a powder bed at high temperature, thereby removing the solvent from the precipitating polymer. The monomer level is reduced by post-polymerizing unreacted monomer.

Precipitation polymerization of N-vinyl formamide (NVF) is known and disclosed in U.S. Pat. No. 4,421,602 issued to F. Brunnmueller et al on Dec. 20, 1983, U.S. Pat. No. 4,623,699 issued to F. Brunnmueller et al on Nov. 18, 1986 and U.S. Pat. No. 5,478,553 issued to R. Chandran et al on Dec. 26, 1995. These patents disclose the precipitation polymerization of N-vinyl formamide (NVF) in solvents such as methanol, ethanol, n- or iso-propanol, t-butanol, acetone and methyl ethyl ketone. The use of toluene, or mixtures of propanol and toluene is also known. However, it is expected that a relatively hydrophobic solvent like toluene would lead to a polymer containing high levels of formamide, a non-polymerizable contaminant that is present in the NVF monomer.

Precipitation polymerization of NVF in methanol is unsuccessful due to the coagulation of the methanol-swollen particles. One approach to circumventing this problem is to polymerize NVF in methanol with the assistance of poly(2-ethyl oxazoline) as a dispersing agent. While this approach may circumvent this problem, it also necessitates the use of a foreign component, which generally is not desired.

In methods of polymerizing NVF described above, there is no mention of methods specifically for removing non-polymerizable contaminants which may be present in the resultant polymer as an artifact of the monomers and/or processes used to prepare the monomers and/or polymers. Such contaminants may include, for example, raw materials used to prepare the monomers, such as formamide in the case of polymers prepared from NVF, intermediates which are formed during manufacture of the monomers and degradation by-products of the manufacture of the monomer. Additionally, non-polymerizable contaminants may be introduced via raw materials used to prepare the polymers, such as the monomers themselves, chain transfer agents, initiators and the like.

Precipitation polymerization of N-vinyl formamide is also disclosed in an article entitled "Synthesis of Amine Functional Homopolymers with N-Ethenylformamide" by R. J. Badesso et al in Adv. Chem. Ser., 1996, (Hydrophilic Polymers), pp. 489–504. This article shows polymerization of N-ethenylformamide by precipitation in iso-propanol followed by washing in iso-propanol or precipitation in t-butanol followed by washing in t-butanol. However, there is no mention in this article of reducing non-polymerizable contaminants in the product.

Polymers having significantly reduced levels of non-polymerizable contaminants particularly are desired and/or required for end-use applications such as cosmetics for application to skin, hair care products and pharmaceuticals.

Therefore, it would be advantageous to develop a precipitation process which not only results in polymers having low residual monomer levels, but also having low non-polymerizable contaminant levels.

The precipitation process of the present invention does not require the use of stabilizers such as poly(2-ethyl oxazoline) and results in polymers which not only have reduced residual monomer levels, but just as important, exhibit significant reduction in the levels of non-polymerizable contaminants such as those discussed herein.

SUMMARY OF THE INVENTION

The present invention is directed to a precipitation polymerization process for the manufacture of polymers prepared from N-vinyl formamide monomer (NVF) in t-butanol diluent and wherein the resulting polymer is washed in a selected different diluent resulting in reduced levels of non-polymerizable contaminants. The process comprises the steps of contacting the NVF with a polymerization medium comprising a t-butanol diluent and a free-radical initiator, under conditions effective to polymerize the NVF, thereby forming a precipitate of poly(vinyl formamide) (PVF) polymer in the polymerization medium, and substantially isolating the precipitated PVF from the polymerization medium. The substantially isolated PVF then is contacted with a selected wash containing a different diluent material under conditions and in amounts effective to reduce the levels of non-polymerizable contaminants in the PVF, particularly formamide. The washed PVF then preferably is substantially isolated from the wash. PVF prepared according to the method of the present invention exhibit reduced levels of non-polymerizable contaminants such as formamide, compared to PVF prepared according to methods known heretofore.

DETAILED DESCRIPTION OF THE INVENTION

The polymer may be a homopolymer of NVF or may be an interpolymer prepared from NVF and at least one vinyl monomer, as that term is defined herein. The interpolymer will comprise at least about 20 weight percent of NVF based on the total weight of monomers and more particularly about 20 to 100 percent by weight of NVF with the balance i.e. 0 to 80 percent being vinyl monomer. Preferably, the interpolymer will comprise at least about 40 weight percent of NVF, with the balance being vinyl monomer. The term "vinyl monomer", as used herein, refers to monomers other than NVF which contain an $\alpha,\beta$-ethylenically unsaturated vinyl group and which are copolymerizable with NVF. Suitable vinyl monomers include, (a) styrene and derivatives thereof, particularly alkyl-substituted styrene, (b) $C_1$–$C_{18}$ alkyl esters of acrylic acid, (c) $C_1$–$C_{18}$ alkyl esters of methacrylic acid, (d) vinyl esters of the formula $CH_2$=CH—OCOR where R is $C_1$–$C_{18}$, (e) alkyl substituted acrylamides and methacrylamides of the formula $CH_2$=CR—$CONR_1R_2$ where R is H or $CH_3$; $R_1$ is H or $C_1$–$C_{12}$ and $R_2$ is $C_1$–$C_{18}$, (f) monoesters and diesters of fumaric, itaconic and maleic acids, (g) vinyl ethers such as methyl vinyl ether, isobutyl vinyl ether and the like, (h) hydroxy functional acrylates and methacrylates such as hydroxyethyl acrylate, hydroxypropyl acrylate, hydroxyethyl methacrylate, hydroxypropyl methacrylate and the like, (i) vinyl monomers containing an amine selected from the group consisting of secondary, tertiary and quaternary amines, such as t-butylaminoethyl methacrylate (t-BAEM), dimethylaminoethyl methacrylate (DMAEMA), diethylaminoethyl methacrylate (DEAEMA), dimethylaminopropyl methacrylate (DMAPMA) and the quarternized derivatives thereof such as methacrylatoethyltrimethyl ammonium chloride (MAPTAC), methacrylatoethyltrimethyl ammonium sulfate (MAETAS) and dimethyl diallyl ammonium chloride (DMDAAC), (j) acrylamide, (k) non-alkyl-substituted acrylamides such as diacetone acrylamide, and (I) acyclic N-vinyl amides, other than NVF, e.g. N-vinyl acetamide, and N-methyl-N-vinyl acetamide. Preferably, the vinyl comonomer is selected from the group consisting of methyl acrylate, methyl methacrylate, 2-hydroxyethyl acrylate, 2-hydroxyethyl methacrylate, 2-hydroxypropyl acrylate, 2-hydroxypropyl methacrylate, vinyl acetate, oligoethylene glycol monomethacrylate, methacrylatoethyltrimethyl ammonium chloride, and the vinyl monomers containing an amine selected from the group consisting of secondary, tertiary and quaternary amine.

The non-polymerizable contaminants present in the polymer which may be introduced via the monomer will depend, in part, on the particular monomer or monomers selected for polymer preparation. For example, where NVF is the monomer of choice, residual formamide may be present at relatively high levels. In addition to such raw materials used to prepare the monomers, non-polymerizable intermediate compounds generated during manufacture of the monomer may be present at high levels. In addition, by-products of monomer preparation, for example degradation products, may be present at high levels in the monomer.

Non-polymerizable raw materials, intermediates and by-products which may be present will depend, not only on the particular monomer of selection, but also on the method used to prepare the monomer. For instance, Japanese patent application 92/334,528, discloses non-polymerizable contaminants which may be present in NVF monomers prepared according to methods disclosed therein. Contaminants disclosed include N-(alpha-hydroxyethyl)formamide, N-(alpha-alkoxyethyl)formamide, unreacted formamide, and ethylidene bis(formamide). Additionally, formate ions may be present as a result of hydrolysis of the formamidino group of the monomer. In methods of making NVF disclosed in U.S. Pat. No. 4,578,515, ethylidene bis(formamide) is a noted intermediate. Due to the fact that most of the reactions disclosed therein exist as equilibria, other by-products such as alpha-substituted ethylidene formamides may be present. In U.S. Pat. No. 4,814,505, formylalaninenitrile is noted as a precursor to NVF and therefore may be present in NVF prepared according to methods disclosed therein.

In addition to contaminants resulting from monomer selection, non- polymerizable contaminants also may be introduced to the polymer via the polymerization process itself. For instance, polymers may contain residual chain transfer agents or polymerization initiators, such as free-radical initiators, which are used in preparing the polymers. Accordingly, chain transfer agents, polymerization initiators and the like should be selected such that they are soluble in the diluent. Additionally, decomposition or combination products resulting from the inefficient utilization of these materials as initiating species also should be considered. The materials preferably are selected such that they and their by-products are suitable for end-uses such as cosmetics and pharmaceuticals. Furthermore, the combination of diluent and initiator should be selected so as to effect polymerization under standard conditions of temperature and pressure. Such temperatures typically range from about 40° C. to about 150° C. Preferably the selected temperature is near the boiling point or reflux temperature of the diluent under standard pressure. The temperature and pressure may deviate from standard conditions under special circumstances, such as the use of volatile components or the necessity to complete certain steps at higher temperature or pressure in order to complete consumption of the initiator.

In order to provide polymers prepared from NVF which are of high purity, i.e. low residual non-polymerizable contaminants, it is best that the monomer, the non-polymerizable contaminants present as a result of the monomer selection, and the non-polymerizable contaminants which may be present due to the polymerization process itself, all are soluble in the diluent. In addition, the polymers prepared from the monomers must be insoluble in the diluent. In this way, not only is the residual monomer level reduced, but the residual non-polymerizable contaminant level also is reduced significantly in the polymer.

In methods of preparing the polymers according to the present invention, homopolymers of NVF and/or copolymers of NVF and the vinyl monomer may be prepared. The NVF and the vinyl monomer, when present, are contacted with a polymerization medium comprising t-butanol diluent and a free-radical initiator, under conditions effective to polymerize the NVF and, when present, the vinyl monomer, thereby forming a precipitate of the polymer in the polymerization medium. Conditions of polymerization such as reaction time, reaction temperature, reflux conditions, mixing, etc., are conventional and are ascertainable to those skilled in the art, particularly once having the benefit of the teachings hereof.

The precipitated polymer then is substantially isolated from the polymerization medium. Isolation of the precipitated polymer may be achieved by any of the methods used in conventional precipitation polymerization processes, such as by filtration, centrifugation, evaporation, or combinations of such isolation techniques. By substantially isolated, it is meant that there may be substantial, but not total, isolation of the precipitated polymer from the polymerization medium. It is not necessary to remove all of the polymerization medium, as the substantially isolated polymer then is treated to further reduce the level of non-polymerizable contaminants.

Subsequent to the substantial isolation of the precipitated polymer from the polymerization medium, the substantially isolated polymer is contacted with a wash containing a selected diluent which is different than the t-butanol diluent used in the polymerization process, under conditions and in amounts effective to reduce the levels of non-polymerizable contaminants in the polymer, Surprisingly, it was discovered that washing the substantially isolated polymer with a wash containing a different diluent significantly reduced non-polymerizable contaminants such as formamide, in comparison to washing the substantially isolated polymer with the same diluent. Using the different diluent wash method of this invention results in the preparation of high purity polymers having residual formamide levels of less than 2,500 parts per milliom (ppm), preferably less than 2,000 ppm and more preferably less than 500 ppm.

The wash diluents which may be used in the process of this invention include n-propanol, iso-propanol, methyl ethyl ketone, acetone, and ethyl acetate with n-propanol being preferred. While the amount of wash diluent used may vary, generally from about 1:0.4 to 1:15 parts by weight of polymer to diluent and preferably about 1:2 to 1:10 parts by weight of polymer to diluent are used. The temperature of the wash can also vary but generally about 50° C. up to the boiling point or reflux temperature of the diluent under ambient pressure concitions. may be used. The number of washes and the amount of diluent per wash can be varied depending on the desired extent of purification.

As noted in the results shown in the examples, polymers prepared in t-butanol and washed with selected different solvents, particularly n-propanol, provide significantly reduced formamide levels over polymers washed with the same t-butanol solvent.

The following examples are intended to exemplify the invention and should not be construed as limiting the metes and bounds of the invention, which are set forth by the claims appended hereto. In these examples, all parts are given by weight and all temperatures in degrees Celsius unless otherwise noted.

EXAMPLE 1
Precipitation polymerization of NVF

Into a 5-I round bottom flask equipped with a stirring shaft powered by a mechanical stirrer, a heating bath, a thermometer and a reflux condenser were added as an initial charge 56.25 g of NVF (N-vinyl formamide), 946 g of t butanol, and t-amyl peroxy pivalate initiator. The mixture was purged with nitrogen and heated to reflux which was held for 15 minutes. At this time a monomer slow-add comprising 443.8 g of NVF and 825 g of t-butanol was added over a period of 3.5 hours. At the same time an initiator slow-add comprising t-amyl peroxy pivalate and t-butanol was started and added over a period of 4 hours. At the end of the initiator addition the mixture was maintained under reflux for 1 hr., then followed by the addition of an additional amount of t-amyl peroxy pivalate in t-butanol over 2 hrs. The mixture was then held under reflux for 5 hours.

The polymer prepared in the above precipitation method was filtered out to isolate the polymer from the diluent. The wet powders were dried at 60° C. overnight, then at 130° C. for 2 hours. The resulting polymer was added to an agitated vessel along with the wash diluents as noted below in Table 1 in the proportion of 80 g of diluent for 20 g of dried powder. The mixture was heated to reflux (or maximum of 80° C.) for 2 hrs. then filtered. In cases where one wash was used, a 5 g portion of the wet polymer was isolated and dried in accordance with the aforementioned procedure. The remainder of the wet cake was taken up again with 80 g of diluent for each initial 20 g of polymer. The mixture was then treated as the previous samples for washing and drying. The samples were compared in formamide level to that of original polymer before any washing treatment. The results shown below in Table 1 clearly indicate the benefit of using a wash system that contains a wash diluent that is different from the t-butanol as used in the polymerization procedure.

TABLE 1

| Wash Diluent | No. of Washings | % Formamide Reduction |
|---|---|---|
| n-propanol | 1 | 88 |
| n-propanol | 2 | 96 |
| methyl ethyl ketone | 2 | 89 |
| ethyl acetate | 2 | 77 |
| iso-propanol | 2 | 73 |
| acetone | 2 | 69 |
| t-butanol | 2 | 31 |

EXAMPLE 2

A polymer of N-vinyl formamide (NVF) was prepared by precipitation polymerization using the same procedure as described in Example 1. The prepared polymer product was filtered out to isolate the polymer from the diluent. The wet polymer was added to the wash diluents as identified in Table 2 in the amount of 4 g of diluent per g of wet polymer. The slurry was heated to reflux which was maintained for 2 hours. After cooling, the polymer was separated out by filtration and dried at 60° C. overnight, then at 130° C. for 2 hours. The washed samples were then evaluated for formamide levels with results shown in Table 2. As noted in the table, the amounts of formamide in the samples washed with a different diluent than the t-butanol used in the polymerization procedure were significantly lower, especially when n-propanol was the wash diluent.

EXAMPLE 3

A copolymer of N-vinyl formamide (NVF) and methacrylamidopropyltrimethylammonium chloride (MAPTAC) was prepared by precipitation copolymerization using a procedure similar to Example 1 except that each 100 parts of NVF were replaced by 90 parts of NVF and 10 parts of MAPTAC. The copolymer (90 NVF/10 MAPTAC) was filtered, isolated and washed with diluents in the same manner described in Example 2. Results are given in Table 2.

TABLE 2

| | Formamide Levels (ppm) | |
|---|---|---|
| Polymer System | NVF | 90 NVF/10 MAPTAC |
| Diluent | t-butanol | t-butanol |
| Unwashed | 970 | 156 |
| Wash Diluent | | |
| n-propanol | 79 | 84 |
| iso-propanol | 207 | 112 |
| methyl ethyl ketone | 251 | 101 |
| acetone | 397 | 150 |
| t-butanol | 429 | 151 |

We claim:

1. A precipitation polymerization process for the manufacture of polymers prepared from N-vinyl formamide monomer, the process comprising:

contacting the N-vinyl formamide monomer with a polymerization medium comprising t-butanol as diluent and a free-radical initiator, under conditions effective to polymerize the N-vinyl formamide monomer, thereby forming a precipitate of the polymer in the polymerization medium, substantially isolating the precipitated polymer from the polymerization medium; and contacting the precipitated substantially isolated polymer with a wash containing a different diluent than the t-butanol used in the polymerization under conditions and in amounts effective to reduce the level of formamide in the polymer to less than 2,500 parts per million (ppm).

2. The method of claim 1 wherein the wash diluent is selected from the group consisting of n-propanol, iso-propanol, methyl ethyl ketone, acetone, and ethyl acetate.

3. The method of claim 1 wherein the wash diluent is n-propanol.

4. The method of claim 1 wherein the polymer is an interpolymer of N-vinyl formamide and at least one vinyl monomer.

5. The method of claim 4 wherein the vinyl monomer is selected from the group consisting of (a) styrene and alky substituted styrene, (b) $C_1$–$C_{18}$ alkyl esters of acrylic acid, (c) $C_1$–$C_{18}$ alkyl esters of methacrylic acid, (d) vinyl esters of the formula $CH_2=CH-OCOR$ where R is $C_1$–$C_{18}$, (e) alkyl substituted acrylamides and methacrylamides of the formula $CH_2=CR-CONR_1R_2$ where R is H or $CH_3$; $R_1$ is H or $C_1$–$C_{12}$ and $R_2$ is $C_1$–$C_{18}$, (f) monoesters and diesters of fumaric, itaconic and maleic acids, (g) vinyl ethers, (h) hydroxy functional acrylates and methacrylates (i) vinyl monomers containing an amine selected from the group consisting of secondary, tertiary and quaternary amines, (j) acrylamide, (k) diacetone acrylamide, and (l) acyclic N-vinyl amides.

6. The method of claim 5 wherein the N-vinyl formamide monomer is present at levels of about 20 to 100 weight percent based on the total weight of monomers used to prepare the polymers.

7. The method of claim 6 wherein the wash diluent is selected form the group consisting of n-propanol, isopropanol, methyl ethyl ketone, acetone and ethyl acetate.

8. The method of claim 6 wherein the wash diluent is n-propanol.

\* \* \* \* \*